United States Patent [19]

Bavis

[11] Patent Number: 4,957,188
[45] Date of Patent: Sep. 18, 1990

[54] CONVEYOR SYSTEM WITH STABILIZED CONVEYOR BASKET

[76] Inventor: Edward F. Bavis, 201 Grandin Rd., Maineville, Ohio 45039

[21] Appl. No.: 249,704

[22] Filed: Sep. 27, 1988

[51] Int. Cl.$^5$ ............................................. E04H 3/04
[52] U.S. Cl. ........................................ 186/41; 186/14; 186/50; 198/468.6; 198/797
[58] Field of Search ................... 186/35, 36, 37, 39, 186/40, 41, 50, 51, 52, 53, 14, 15, 16, 17, 18, 34; 198/797, 750, 346.2, 468.6, 468.8, 798, 799; 226/76

[56] References Cited

U.S. PATENT DOCUMENTS

| | | | |
|---|---|---|---|
| 847,147 | 3/1907 | Arthur | 198/797 X |
| 1,706,913 | 3/1929 | Bush | 198/468.6 |
| 2,896,748 | 7/1959 | McClintock | 186/37 |
| 4,411,336 | 10/1983 | Anders | 186/37 |
| 4,624,359 | 11/1986 | Gross | 198/468.6 X |

FOREIGN PATENT DOCUMENTS 36067  3/1967  Finland ............................... 198/797

Primary Examiner—F. J. Bartuska
Attorney, Agent, or Firm—Frost & Jacobs

[57] ABSTRACT

A carrier basket is suspended between an opposing pair of drive members which define a path of travel between a processing station and a remote delivery station, the path of travel having vertical flights at each station interconnected by a horizontal flight. To prevent rocking movement of the suspended carrier basket, it is provided at its opposite ends with diametrically opposite cam rollers which are sequentially engaged in cam tracks extending along the path of travel of the carrier basket, a first cam track lying at one end of the carrier basket and extending between the processing station and a point intermediate the horizontal flight of the conveyor, the other of the cam tracks lying at the opposite end of the carrier basket and extending between the intermediate point and the delivery station. Guide rails are provided opposite the cam tracks to maintain the cam rollers in engagement with their respective cam tracks, and additional guide members may be provided to effect smooth translation of the carrier basket between the vertical and horizontal flights. An improved carrier basket is also provided which is displaceable relative to the drive members on which it is mounted in the event an obstruction interferes with downward movement of the carrier basket as it approaches either station.

15 Claims, 5 Drawing Sheets

CONVEYOR SYSTEM WITH STABILIZED CONVEYOR BASKET

This invention relates to conveyor systems of the type used in drive-in restaurants and similar drive-in service facilities, wherein a carrier or basket is utilized to convey the food or other items from a processing station to one or more remote delivery stations.

BACKGROUND OF THE INVENTION

This invention relates to the type of conveyor systems taught in co-pending U.S. patent application Ser. No. 07/080,494 filed July 31, 1987, and entitled Food Service System For Drive-In Restaurants. In its basic form, the system contemplates the provision of at least one processing station at which the customer's order is filled and then transported to one or more delivery stations which are remote from the processing station, the items which have been ordered being conveyed from the processing station to each remote delivery station by means of a conveyor system having a basket-like carrier which transports the items through a housing extending vertically upwardly from the processing station, then horizontally through a canopy overlying the drive-in lanes, and then vertically downwardly through a housing forming a part of the delivery station. During its travel between the respective stations, the basket-like carrier must be maintained in an upright position to ensure that the items in the basket will not be spilled or overturned.

In accordance with the teachings of the aforementioned co-pending application, the basket is suspended between an opposing pair of spaced apart drive members which define a path of travel for the carrier basket extending between the processing station and the remote delivery station. The drive means may comprise an opposing set of conveyor chains, drive belts or an opposing set of elastomeric drive tapes. In any case, the basket is pivotally mounted relative to the drive members and hence will remain upright irrespective of whether the drive members are moving horizontally or vertically.

While the pivotal suspension of the basket in the manner described will effectively maintain it in an upright position, it has nonetheless been found that the basket is subject to rocking movement as it travels between the stations, which movement is compounded by the fact that the basket may be unevenly loaded and hence will inherently tend it to tip in one direction or the other. The present invention overcomes these difficulties by providing stabilizing means which will ensure that the carrier basket will remain upright and free from swinging movement as it travels between the stations.

SUMMARY OF THE INVENTION

In accordance with the invention, the carrier basket is provided at its opposite ends with diametrically opposite guide rollers adapted to be selectively engaged by cam tracks which follow the path of travel of the basket as it moves between the opposing stations.

A first cam track lies adjacent one end of the basket and extends from the processing station to a point intermediate the horizontal flight of the basket, i.e., approximately midway between the stations. A second cam track lies adjacent the opposite end of the basket and extends between the aforementioned intermediate point and the delivery station. Thus, the basket is under the control of first one of the cam tracks and then the other. This arrangement permits each of the cam tracks to be located to the rear side of the basket as it approaches each of the stations. This is particularly desirable at the delivery station where it is preferred that the basket be projected outwardly relative to a dispensing opening in the housing which surrounds the operating mechanism of the conveyor at the delivery station.

Guide rails are provided to ensure that the cam rollers on the carrier basket will remain in positive contact with the cam tracks as the carrier basket moves between the stations. These rails lie at the ends of the carrier basket opposite the cam tracks and effectively prevent sidewise movement of the basket which would permit the rollers to slip from the tracks. In order to ensure positive control of the carrier basket as it translated between the vertical and horizontal flights of the conveyor, supplementary guide members are provided which are positioned to be contacted by the guide roller opposite the guide roller which is in engagement with the cam track, thereby providing positive control at both ends of the carrier basket during translation.

The invention also contemplates the provision of an improved carrier basket which permits vertical displacement of the basket should an obstruction be encountered as the basket approaches either station. Prior baskets were of a non-yielding type which could cause injury to a person or damage to the conveyor system, depending upon the nature of the obstruction encountered. The displaceable mounting of the carrier basket precludes such possibility in that the basket will move upwardly relative to its mounting if an obstruction is encountered.

While the invention will be described in conjunction with a conveyor system utilizing an elastomeric drive tape, it is to be understood that the invention is applicable to conveyor systems wherein the carrier basket is conveyed by other means, such as chain or gear belt drives.

DESCRIPTION OF THE DRAWINGS

FIG. 4 is an enlarged perspective view of a carrier basket in accordance with the invention.

DESCRIPTION OF THE PREFERRED EMBODIMENT

Figure 1:
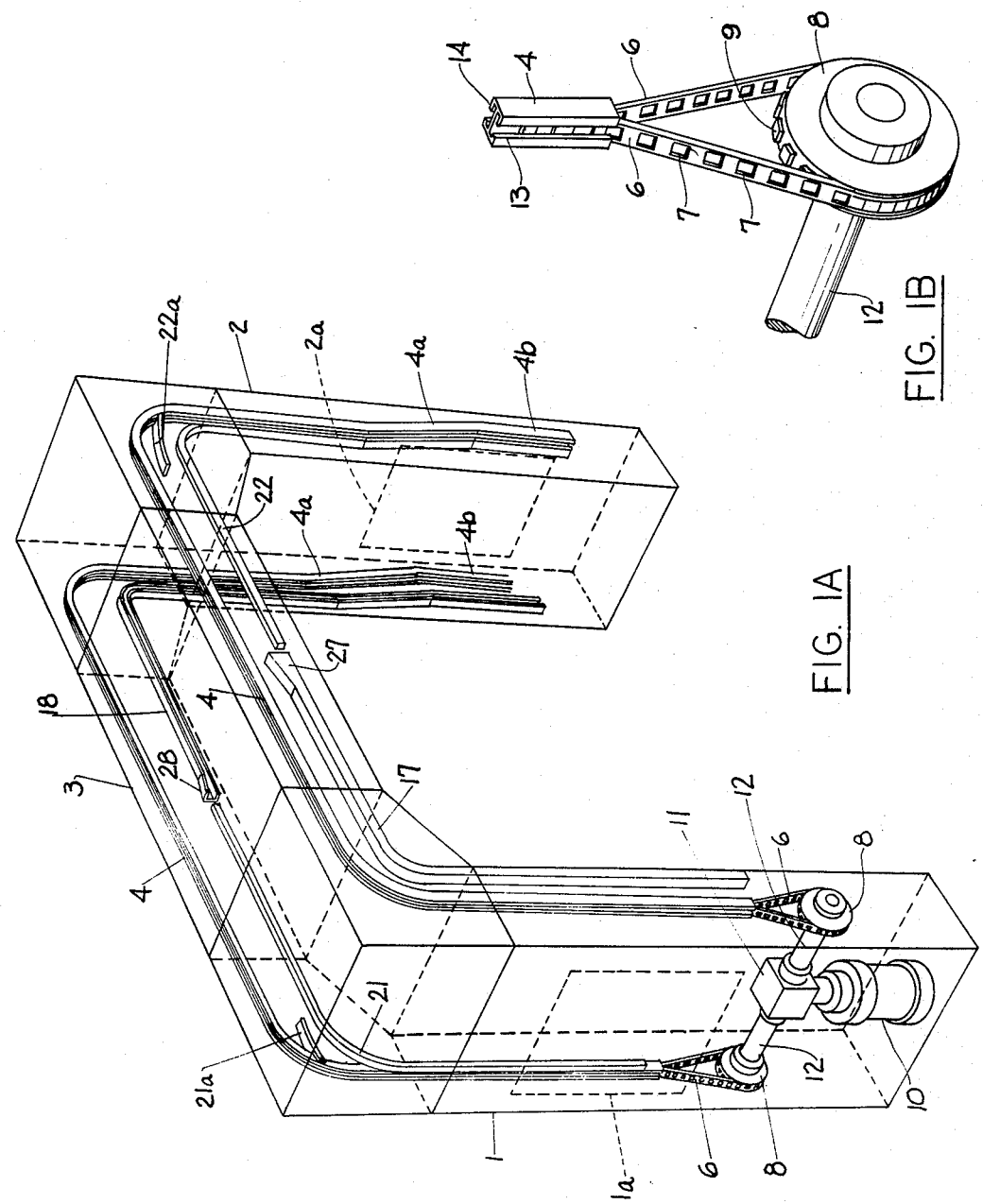
FIG. 1A is a diagramatic perspective view of a conveyor system in accordance with the invention.
FIG. 1B is an enlarged fragmentary perspective view of the drive tape and associated drive means.
Figure 2:
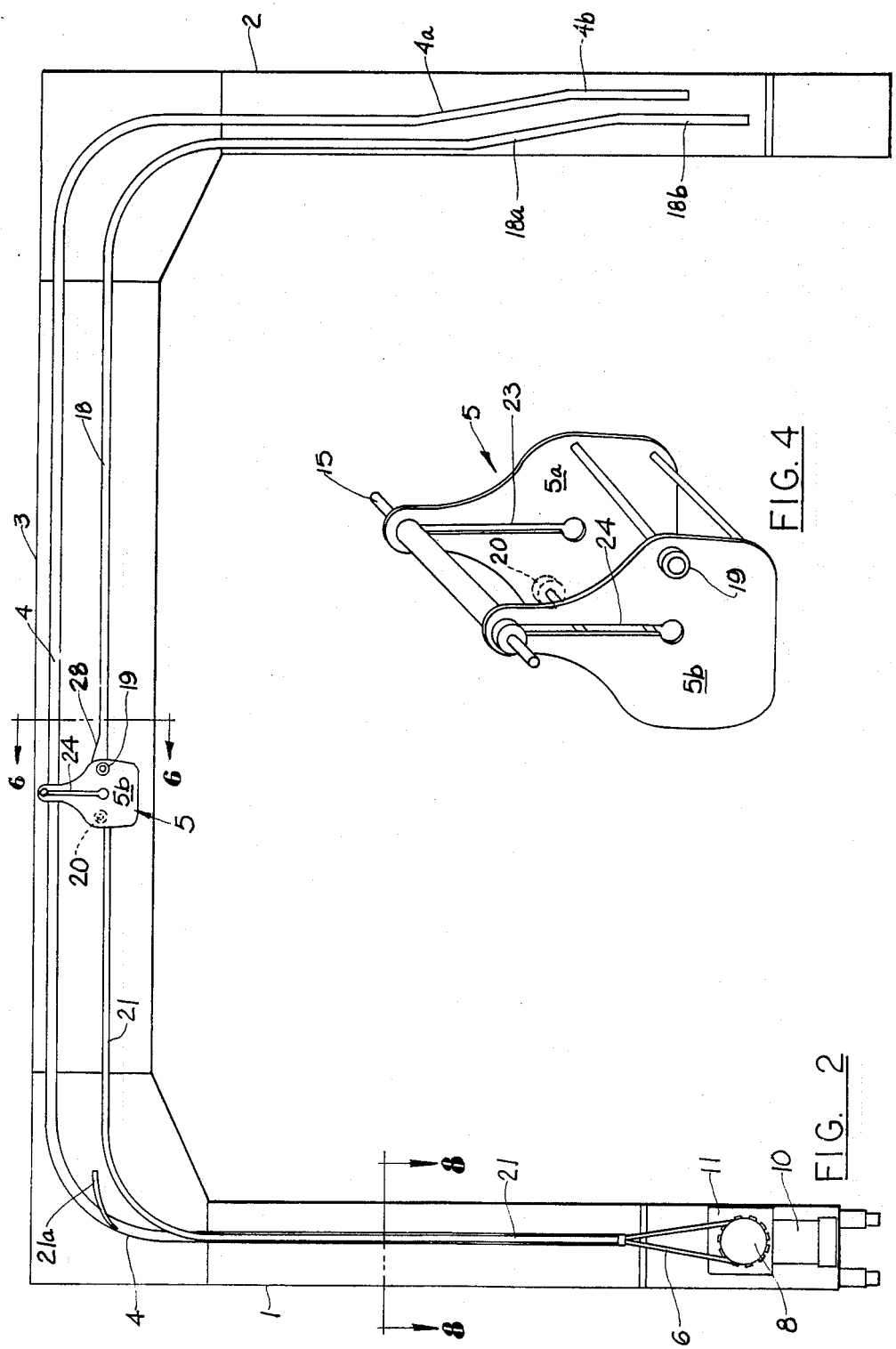
FIG. 2 is an enlarged vertical sectional view illustrating the left side of the conveyor system seen in FIG. 1 looking from right to left.
Figure 3:
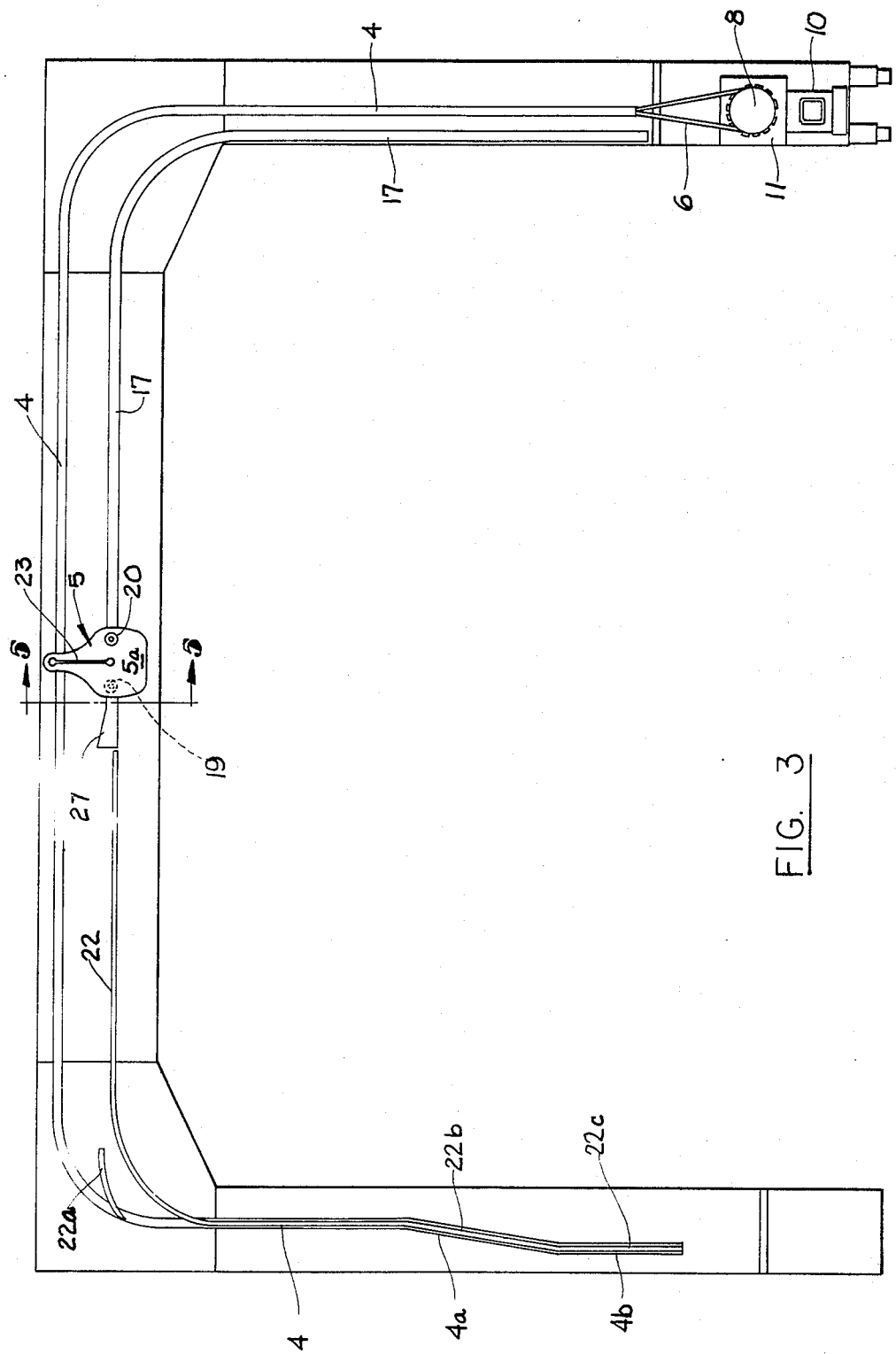
FIG. 3 is an enlarged vertical sectional view illustrating the right side of the conveyor system seen in FIG. 1 looking from left to right.

Referring first to FIG. 1 of the drawings, which illustrates the basic operating components of the system, there is a first vertical housing 1 adapted to be located at the processing station, such as an area in a drive-in restaurant where customer orders are processed and placed in the carrier basket of the conveyor through access opening 1a. A second vertical housing 2 is adapted to be positioned at a remote drive-through customer lane, the housing 2 having a discharge opening 2a. The vertical housings are interconnected by a horizontal housing 3 which may be formed in whole or in part by a canopy or other roof forming structure extending outwardly over the drive-through lane or lanes. It will be understood that if multiple drive-through lanes are to be serviced, a separate conveyor will be provided for each lane, the conveyors being of essentially identical construction except for the length of the horizontal flight.

The conveyor system comprises an opposing pair of guide members 4 which extend upwardly through vertical housing 1, then horizontally through horizontal housing 3, and then downwardly through vertical housing 2, the opposing guide members 4 defining a path of travel for the carrier basket 5 (seen in FIGS. 2 through 8) which is adapted to be suspended between the opposing guide members 4. The carrier basket is adapted to be driven between the opposing stations by elastomeric drive tapes 6, such as Dymetrol ® drive tapes manufactured by Dupont. These tapes are flexible and may be bent and twisted and yet are sufficiently rigid so that they be utilized to both push and pull. The tapes 6 are provided with a continuous series of spaced apart perforations 7, best seen in FIG. 1B, adapted to be engaged by cog wheels or sprockets 8 having lugs 9 which engage the perforations 7 in the drive tapes. In the embodiment illustrated, the cog wheels 8 are driven by a reversible motor 10 acting through a gear box 11 and drive shafts 12 housed at the lower end of the processing station housing 1. It will be understood that the system will be provided with suitable controls, normally at the processing station, to activate and deactivate the conveyor, although a return control for the carrier basket also may be provided at the delivery station.

Figure 5:
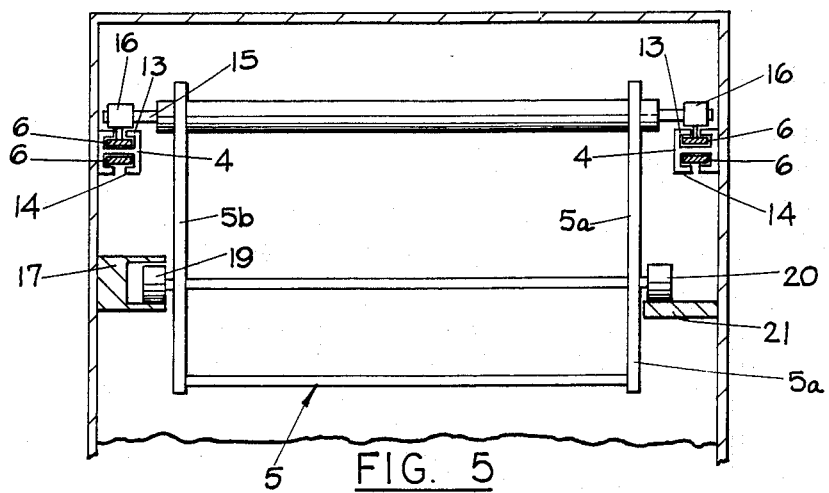
FIG. 5 is an enlarged fragmentary vertical sectional view taken along line 5—5 of FIG. 3.
Figure 6:
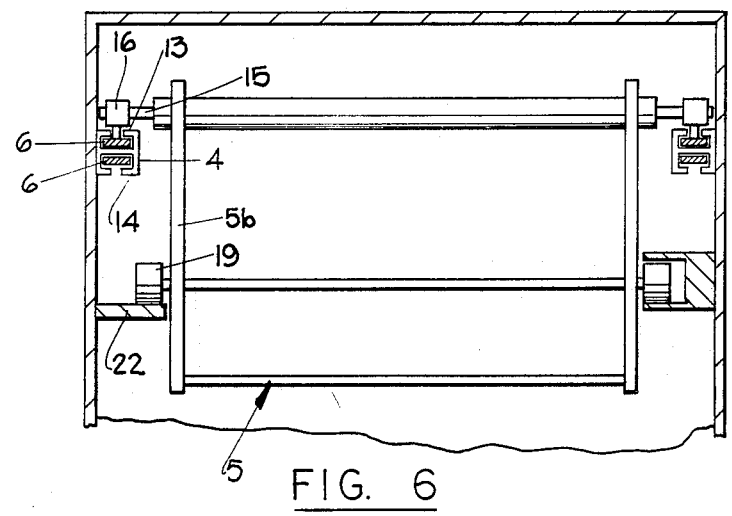
FIG. 6 is an enlarged fragmentary vertical sectional view taken along line 6—6 of FIG. 2.
Figure 8:
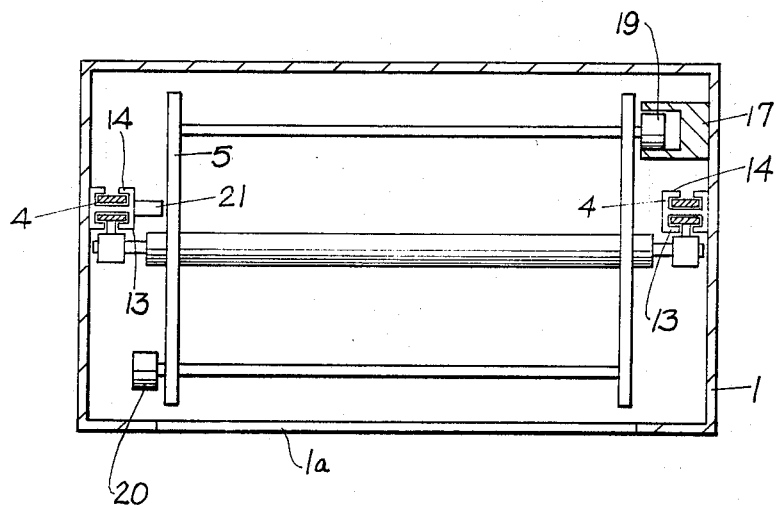
FIG. 8 is an enlarged sectional view taken along the line 8—8 of FIG. 2.

Since the drive tapes may be either pushed or pulled, it is not necessary that they be continuous, and to this end the guide members 4 are preferably formed as opposing C-shaped channels 13, 14, as best seen in FIGS. 5, 6 and 8, the upper or outermost channels 13 housing the "drive" portions of the tapes 6, whereas the inner or under channels 14 constitute storage channels for the remainder of the tapes. Thus, the tapes will be stored in the channels 14 when the carrier basket is at the processing station, and will be withdrawn from the channels 14 as the tapes are driven toward the delivery station by the cog wheels 8, the tapes being of a sufficient length such that their trailing ends will remain in the channels 14 when their leading ends reach their fully extended positions at the delivery station.

As also seen in FIGS. 5, 6 and 8, the carrier basket 5 is suspended from a shaft 15 which is journaled at its opposite ends in mounting blocks 16 fixedly secured to the drive tapes 6 at their leading ends. When the tapes are in their fully retracted positions, the carrier basket will be at the processing station, whereas when the tapes are in their fully extended positions, the basket will be at the delivery station. Since the carrier basket is suspended from the tapes and is free to rotate relative to the mounting blocks 16, it will remain vertically disposed as the tapes translate between the horizontal and vertical flights of the conveyor. However, as previously noted, if supported solely by the mounting blocks 16, the basket is free to rock back and forth, a condition which is aggravated both by the movement of the tapes as they start and stop, and also during translation from vertical to horizontal, the rocking movement being magnified if the basket is not evenly loaded.

In accordance with the invention, the carrier basket is stabilized by the cam tracks 17 and 18 which lie in spaced relation to the guide members 4 and parallel the path of travel of the carrier basket. The cam tracks 17 and 18 lie on opposite sides of the conveyor, the cam track 17 serving to stabilize the carrier basket as it moves between the processing station and a point intermediate the horizontal flight of the conveyor. As the carrier basket approaches the end of cam track 17, its opposite end is engaged by the cam track 18 which serves to stabilize the carrier basket throughout the remainder of its travel to the discharge station. To this end, and as perhaps best seen in FIG. 4, the ends of the carrier basket mount a diametrically opposite pair of cam rollers 19 and 20 adapted to engage the cam tracks 17 and 18, respectively. Thus, when the carrier basket 5 is at the processing station, the cam roller 19 is in engagement with the cam track 17, whereas when the carrier basket is at the delivery station, the diametrically opposite cam roller 20 is in engagement with the cam track 18. With this arrangement, the operative cam roller is at the rear of the carrier basket when at either station and hence remote from the openings 1a and 2a in the housings.

To effect a smooth transfer from one cam track to the other, the cam track 18 may be provided with a tapered enlargement 28 at its leading end to receive the cam roller 20 as the carrier basket advances toward the discharge station. Cam track 17 also has a tapered enlargement 27 to receive cam roller 19 when the carrier basket is traveling in the opposite direction. It has been found desirable for the cam tracks to overlap for a short distance to ensure stability during transfer from one track to the other.

Opposing guide rails 21 and 22 are provided to ensure that the cam rollers 19 and 20 remain in positive contact with their respective cam tracks. Thus, as seen in FIGS. 5 and 6, the rail 21 is positioned to ensure that the cam roller 19 remains engaged with the cam track 17, the rail 21 being positioned to abut against the outer surface of end wall 5a of the carrier basket 5. Similarly, when the cam roller 20 is in engagement with the cam track 18, the rail 22 abuts the outer surface of adjacent end wall 5b of the carrier basket, again ensuring that the opposing cam roller 20 will remain in positive contact with its cam track 18. Preferably, the rails 21 and 22 will be formed from a lubric material, such as Nylon, and the cam rollers may ride on the upper surfaces of the rails during their travel in a horizontal path, adding further stability to the carrier basket.

Figure 7:
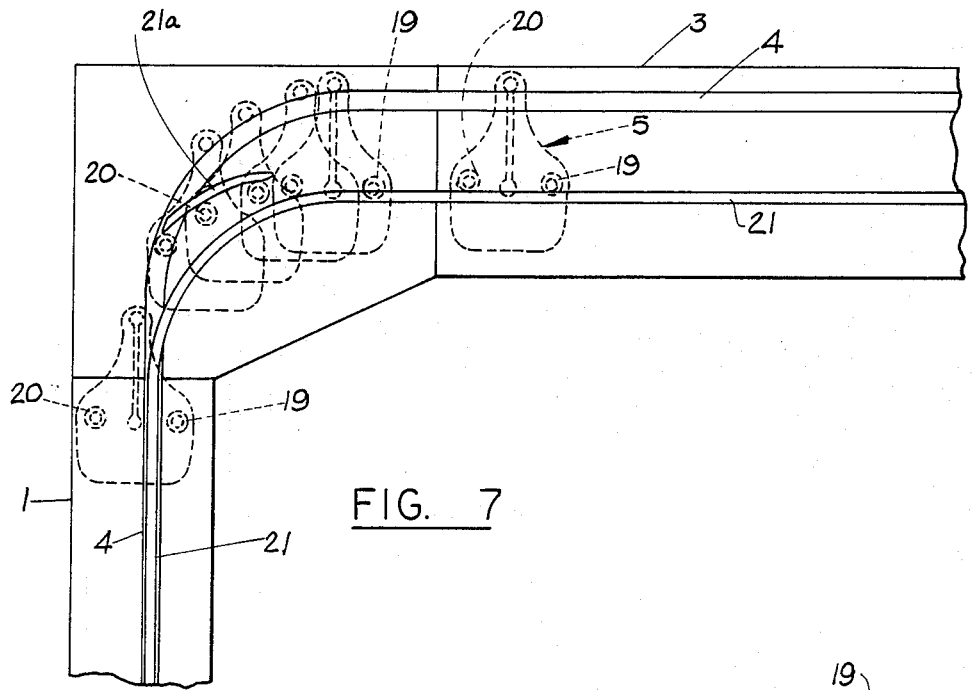
FIG. 7 is an enlarged fragmentary elevational view illustrating the translation of the carrier basket between the vertical and horizontal flights of the conveyor.

It has been found that despite the fact that the carrier basket is being stabilized by the guide tracks 17 and 18, chattering or tilting movement of the carrier basket may be encountered during translation between the vertical and horizontal flights of the conveyor at which time the carrier basket is being pulled by the drive tapes in a curved path of travel. To overmove the unstabilizing forces which occur during translation, supplementary guide members 21a and 22a (seen in FIGS. 1, 2, 3 and 8) are provided which coact with the cam rollers 19 and 20 to further stabilize the carrier basket during translation. These supplementary guide members, which may be in the form of elongated fingers affixed at one end to the adjacent guide member 4, are positioned to be contacted by the adjacent guide roller on the carrier basket. Thus, as illustrated in FIG. 7, as the carrier basket 5 travels upward from the processing station and begins to move in an arcuate path, the guide roller 20 will pass beneath and contact the supplementary guide member 21a which stabilizes the basket during translation against forces tend to rock the basket or cause chattering, i.e., back and forth vibration.

Similarly, the supplementary guide member 22a will perform a like function at the opposite end of the conveyor, the supplementary guide member 22a being positioned to be contacted by the cam roller 19 at the opposite end of the carrier basket. Thus, during translation between the horizontal and vertical flights, both ends of the carrier basket are under positive control and held against rocking movement.

As taught in co-pending application Ser. No. 07/080,494, when the carrier basket reaches the discharge opening 2a in housing 2, it is preferred that the carrier basket be projected outwardly toward the customer, and to this end, the guide members 4 are provided with outwardly inclined sections 4a which may be subtended by lower vertical sections 4b. The outwardly inclined sections 4a serve to displace the carrier basket outwardly toward discharge opening 2a, and the lower vertical sections 4b permit vertical movement of the carrier basket once it has been projected outwardly, thereby providing for multiple delivery positions, as where a first or "high" position is provided for trucks and vans, with a "low" position for vehicles which are lower to the ground. These positions may be established by controls at the processing station and/or by controls at the delivery station.

Since the carrier basket will be displaced outwardly, the cam track 18 is configured to provide a corresponding inclined section 18a and a corresponding lower vertical section 18b, thereby assuring that the carrier basket will remain upright as it is moved outwardly. Similarly, the guide rail 22 is provided with an inclined section 22a and a lower vertical section 22b (seen also in FIG. 3) which ensure that the carrier basket will not move endwise so as to permit the cam roller 20 to lose contact with the cam track 22.

The aforesaid co-pending application also teaches the provision of a safety bar at the discharge station which, when elevated, will actuate a safety switch to de-energize the drive motor in the event the carrier basket commences upward movement while the customer's hand is in the carrier or there is some other obstruction which would prevent free upward movement of the carrier. The present invention provides an added safety feature during downward movement of the carrier basket, as where the customer's hand or arm, or other obstruction, is in the path of the descending basket. In this event, and as seen in FIG. 4, the opposite end walls 5a and 5b of the basket are provided with elongated vertically extending slots 23 and 24, the upper ends of which engage the shaft 15 by means of which the carrier basket is pivotally mounted to the blocks 16. If an obstruction is encountered, the carrier basket 5 will move upwardly relative to the shaft 15 by reason of the elongated slots 23 and 24, thereby permitting the basket to effectively stop even though the drive tapes 6 and the mounting blocks 16 continue their downward movement. While the carrier basket is effectively stopped, it will nonetheless remain in upright condition due to the stabilizing effect of the adjacent cam track and the opposing guide rail.

As should now be apparent, the present invention provides an improved conveyor system in which the conveyor basket is stabilized throughout its path of travel, with the stabilizing means being maintained to the rear of the carrier basket where it is effectively inaccessible to persons either loading or unloading the carrier basket. In addition, provision is made to permit relative displacement between the carrier basket and its mounting means as the carrier approaches either station, thereby preventing possible injury to a person and/or damage to the conveyor system without the necessity for cut-off switches.

Modifications may be made in the invention without departing from its spirit and purpose. For example, the horizontal flight of the conveyor could be placed lowermost, i.e., the system inverted, with the conveyor basket traveling vertically downwardly, then horizontally beneath the drive-in lanes or other surface, and then vertically upwardly to the remote station.

What is claimed is:

1. In a conveyor system for delivering items from a processing station to a remote delivery station, each station having an access opening therein, an opposing pair of spaced apart drive members, guide means positioned to define mating paths of travel for said drive members in which said drive members travel both vertically and horizontally between said stations, reversible drive means operatively connected to said drive members to move them in unison, a carrier basket suspended from said drive members in a horizontally disposed upright position, means rotatably mounting said carrier basket relative to said drive members, whereby said carrier basket will rotate relative to said drive members so as to remain in upright position irrespective of whether said members are travelling vertically or horizontally, and stabilizing means for preventing rocking movement of said carrier basket as it travels between said stations, said stabilizing means comprising a pair of cam tracks positioned to follow the paths of said drive members throughout a portion of their paths of travel, a first of said cam tracks being positioned to follow a first of said drive members between a first of said stations and an intermediate point in the path of travel of said first drive member, said first cam track being spaced rearwardly relative to the path of travel of said first drive member when at said first station, the second of said cam tracks being positioned to follow the second of said drive members between the other of said stations and an intermediate point corresponding to the intermediate point in the path of travel of said first drive member, said second cam track being spaced rearwardly relative to the path of travel of said second drive member when at the other of said stations, and cam track follower means mounted on said carrier basket engageable with said cam tracks, said cam track follower means comprising a first cam roller mounted on one end of said carrier basket engageable with said first cam track, and a second cam roller mounted on the opposite end of said carrier basket engageable with said second cam track, said cam rollers being offset in opposite directions from a vertical plane passing through the axis of rotation of said carrier basket, said cam rollers being positioned so that the cam roller in engagement with its respective cam track is at the rear of the carrier basket when the carrier basket is at either station, whereby both the cam track and the operative cam roller are remote from the access openings at said stations.

2. The conveyor system claimed in claim 1 including means for maintaining said cam rollers in contact with their respective cam tracks.

3. The conveyor system claimed in claim 2 wherein the means for maintaining said cam rollers in contact with their respective cam tracks comprise a first elongated guide rail positioned to contact the end of the carrier basket remote from said first cam track, and a second elongated guide rail positioned to contact the end of the carrier basket remote from said second cam track.

4. The conveyor system claimed in claim 3 including supplemental guide members positioned to contact said cam rollers during translation of said carrier basket between vertical and horizontal travel.

5. The conveyor system claimed in claim 4 wherein a first supplemental guide member is positioned to be contacted by said first cam roller when said second cam roller is in contact with said second cam track, and wherein a second supplemental guide member is positioned to be contacted by said second cam roller when said first cam roller is in contact with said first cam track.

6. The conveyor system claimed in claim 5 wherein said supplemental guide members comprise elongated fingers positioned to be contacted by said cam rollers.

7. The conveyor system claimed in claim 6 wherein said supplemental guide members are mounted on said guide means.

8. The conveyor system claimed in claim 1 wherein said drive members comprise elastomeric drive tapes, and wherein said guide means comprise elongated C-shaped channels in which said drive tapes are slidably received.

9. The conveyor system claimed in claim 8 wherein said guide means comprise back-to-back elongated C-shaped channels each adapted to receive portions of said drive tapes.

10. The conveyor system claimed in claim 1 wherein said guide means include mating inclined segments at one of said stations positioned to displace said carrier basket laterally outwardly, and wherein the adjoining cam track includes a correspondingly inclined section.

11. The conveyor system claimed in claim 1 wherein the means rotatably mounting said carrier basket relative to said drive members comprise mounting blocks affixed to said drive members and a carrier rod extending between said mounting blocks, wherein the opposite ends of said carrier basket have elongated vertically disposed slots therein, and wherein said carrier rod extends through said vertical slots, whereby said carrier basket is suspended from said carrier rod and is displaceable relative to said carrier rod.

12. In a conveyor system wherein a carrier basket is conveyed between first and second stations by a spaced apart pair of drive members, a carrier basket having opposing end walls, mating elongated vertical slots in said opposing end walls, a said carrier rod extending through said slots, whereby said carrier basket may be suspended between the drive member by securing the opposite ends of said carrier rod to the guide members and said carrier basket may be displaced relative to said carrier rod, and stabilizing means to prevent rocking movement of the carrier basket as it is conveyed by the drive members, said stabilizing means comprising cam tracks positioned to follow the paths of travel of the drive members, and having cam track follower means mounted on said carrier basket engagable with said cam tracks.

13. The combination claimed in claim 12 wherein said cam track follower means comprise cam rollers mounted on the opposing end walls of said carrier basket.

14. The combination claimed in claim 13 including guide rails positioned to maintain said cam rollers in engagement with said cam tracks.

15. The combination claimed in claim 14 wherein the drive members have vertical flights extending upward from each station, and a horizontal flight extending between the upper ends of the vertical flights, and wherein supplementary guide means are positioned to be engaged by said cam rollers during translation between the horizontal and vertical flights.

* * * * *